US00H002161H

(19) United States
(12) Statutory Invention Registration
Scheps

(10) Reg. No.: US H2161 H
(43) Published: Jul. 4, 2006

(54) SOLID STATE LASER PUMPED BY VISIBLE LIGHT-EMITTING-DIODE

(75) Inventor: Richard Scheps, Rancho Sante Fe, CA (US)

(73) Assignee: The United States of America as represented by the Secretary of the Navy, Washington, DC (US)

(21) Appl. No.: 10/368,946

(22) Filed: Feb. 18, 2003

(51) Int. Cl.
*H01S 3/91* (2006.01)

(52) U.S. Cl. ..... 372/75; 372/21; 372/70; 372/71

(58) Field of Classification Search ..... 372/21, 372/70, 71, 75
See application file for complete search history.

(56) References Cited

U.S. PATENT DOCUMENTS

| | | | | | |
|---|---|---|---|---|---|
| 5,034,949 | A | * | 7/1991 | Gunter | 372/21 |
| 5,090,019 | A | | 2/1992 | Scheps | |
| 5,249,189 | A | | 9/1993 | Scheps | |
| 5,260,963 | A | | 11/1993 | Baird et al. | |
| 5,708,672 | A | * | 1/1998 | Pessot et al. | 372/71 |
| 5,740,190 | A | | 4/1998 | Moulton | |
| 5,982,789 | A | | 11/1999 | Marshal et al. | |
| 6,009,114 | A | * | 12/1999 | Heller et al. | 372/75 |
| 6,097,741 | A | | 8/2000 | Lin et al. | |

OTHER PUBLICATIONS

Pinckney, "Transition Element–Doped Crystals in Glass" Inorganic Optical Materials III, Proceedings of SPIE, Aug. 2001, pp. 93–99, San Diego, CA.

* cited by examiner

*Primary Examiner*—Daniel Pihulic
(74) *Attorney, Agent, or Firm*—Peter A. Lipovsky; Michael A. Kagan; Allan Y. Lee

(57) ABSTRACT

Visible light-emitting-diodes (LEDs) are inexpensive, provide emissions in many wavelengths and are powerful enough to pump solid state laser rods. The LED light is directed to the laser rod (laser gain element). The LED wavelength chosen matches the absorption spectrum of a transition element contained in the laser rod. It is know that the absorption bandwidths of these elements are typically very large. Besides a single LED, an array of LEDs may be used. Either of these arrangements may be imaged on the laser rod or fiber-coupled to the rod. A laser system that is pumped by one or more LEDs provides a low cost, relatively low power laser system. A low cost, higher powered, pulsed laser system is possible by pulsed LED operation. Thus it is possible to exceed the pump power threshold for a given laser by using a relatively small number of LEDs.

27 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLID STATE LASER PUMPED BY VISIBLE LIGHT-EMITTING-DIODE

BACKGROUND OF THE INVENTION

Lasers containing solid state transition element laser rods, such as those containing chromium (Cr) and titanium (Ti), are typically pumped by other lasers, including laser diodes. See for example, U.S. Pat. No. 5,090,019 and U.S. Pat. No. 5,249,189, both of which are issued to the inventor and are incorporated by reference herein. It is known that transition element doped lasers typically absorb pumping radiation at shorter wavelengths (in general) than rare-earth doped lasers, such as neodymium (Nd) or ytterbium (Yb). However laser pump sources in the visible range, such as red for $Cr^{3+}$ or green for $Ti^{3+}$, are either very expensive or are non-existent.

While a great deal of research has been conducted in the field of lasers, there is a continual desire to lower their costs.

SUMMARY OF THE INVENTION

Visible light-emitting-diodes (LEDS) are inexpensive, provide emissions in many different wavelengths and are powerful enough to pump a solid state laser rod. In accordance with the invention, LED light is directed to the laser rod, otherwise known as the laser gain element. The LED wavelength is selected to match the absorption spectrum of a transition element contained in the laser rod. It is know that the absorption bandwidths of these elements tend to be very large. Besides a single LED, an array of LEDs may be used. Either of these arrangements may be imaged on the laser rod or may be fiber-coupled to the rod. A laser system that is pumped by one or more light-emitting-diodes provides a low cost, relatively low power, laser system. A low cost, higher powered, pulsed laser system is made possible by pulsed LED operation. Thus it is possible to exceed the pump power threshold for a given laser by using a relatively small number of LEDs to pump the laser.

An object of this invention is to provide a laser system that is of relatively low cost.

A further object of this invention is to provide an optical pump system designed for use with transition element doped solid-state laser rods.

Still a further object of the invention is to provide a laser system designed for use with transition element doped solid-state laser rods wherein laser pumping is provided by one or more light-emitting-diodes.

Other objects, advantages and new features of the invention will become apparent from the following detailed description when considered in conjunction with the accompanied drawings.

DESCRIPTION

Figure 1:
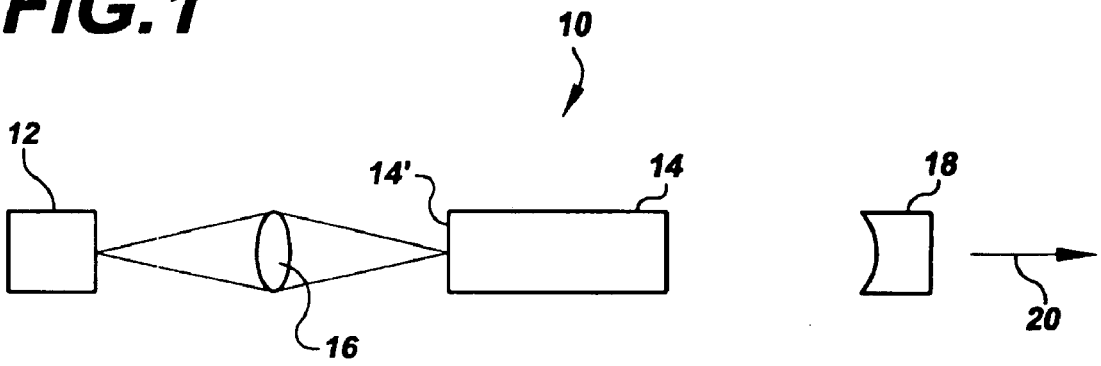
FIG. 1 illustrates a first embodiment of an LED pumped solid state laser system.

Referring now to FIG. 1, a single LED driven embodiment, system 10, is shown. System 10 includes an LED 12 chosen so that its particular visible emission spectrum is compatible with the absorption band of a transition element doped solid state laser rod 14. This compatibility is such that the visible light emission from LED 12 will provoke a laser emission in rod 14. To focus the emission of LED 12 onto rod 14, transfer optics 16 may be used used. In a well understood manner, the pumping emission is allowed to enter rod 14 at a waist end 14'. Coatings at this end permit the pump emission to enter the rod, while at the same time discourage laser wavelength emission from exiting rod end 14'. As is also in a well understood manner, a mirror 18 is provided to create a resonant cavity whose length is dictated by the distance between mirror 18 and a back-reflecting coating at end 14' of rod 14. Mirror 18 is highly reflective at the laser emission wavelength but at the same time is partially transmissive thereto, to allow an output emission 20 from laser system 10.

The nature of the transferring optics, coatings, laser rod specifications, cavity length and mirror configuration are considered within the skill of artisans of this field. It should be noted that because LEDs are less directional in their emission when compared to laser-based pumping sources including laser diodes, larger aperture, higher numerical aperture (NA), optics will be required to appropriately collect the LED light.

As described above, the LED or LEDs may be powered to operate continuous wave to produce a continuous laser emission or may be powered to operate pulsed to produce a pulsed emission in the laser being pumped. When pulsed, the LEDs produce much higher power for short periods of time, allowing high pulsed power of a laser. For example, a 1 milli-Watt output normally continuous wave LED when pulsed at pulse widths of less than 100 nanoseconds can emit approximately 5 to 50 watts for short periods of time (about 100 nanoseconds). This allows higher power, pulsed operation of a laser system employing the pulsed LED(s). Laser rods that may be LED pumped in the red are, for example, those of Cr:LiSAF. Laser rods capable of LED pumping in green as well as blue are, for example, those of $Ti:Al_2O_3$.

Figure 2:
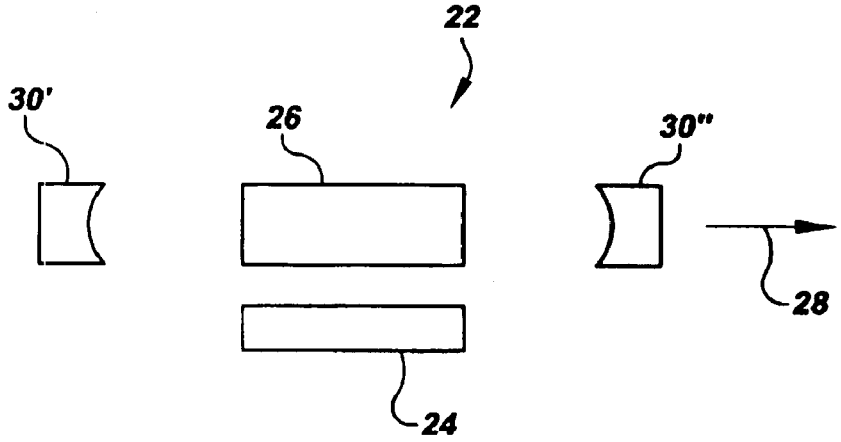
FIG. 2 illustrates a second embodiment of an LED pumped solid state laser system.

Referring now to FIG. 2, an alternative laser system embodiment 22 is shown. In system 22, an array of visible emitting LEDs 24 is employed to pump transition element doped laser rod 26, in this instance, in a direction that is orthogonal to the direction of laser emission 28. In a well understood manner, rod 26 may be coated to be amenable to reception of the orthogonally directed LED generated light, while discouraging the transfer of emissions of other wavelengths in this direction. Laser emission within rod 26 is allowed to transfer between mirrors 30' and 30" whereby the mirrors create the physical extremes of a laser resonant cavity. Mirror 30" is made partially transmissive to the laser emission to allow laser output 28.

Figure 3:
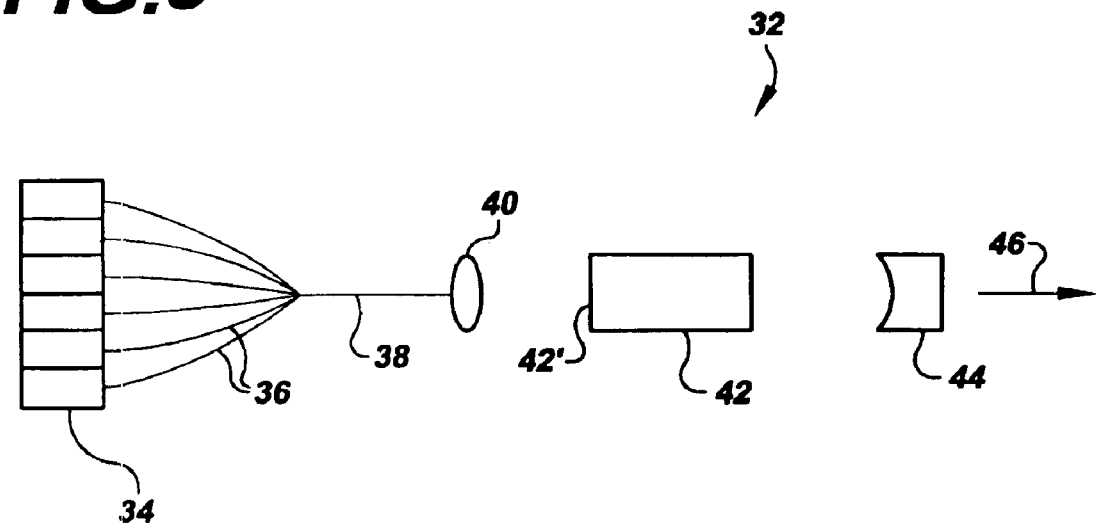
FIG. 3 illustrates a third embodiment of an LED pumped solid state laser system.

Turning now to FIG. 3, yet another embodiment 32 is shown wherein fiber optics are used to couple LED emission to a transition element doped laser rod to effectuate laser pumping of the rod. As can be seen, a plurality of LEDs 34 have their visible light outputs directed by fibers 36 to a common fiber bundle 38. Similar to the embodiment of FIG. 1, the LED output (combined) is directed to transfer optics 40 that is used to image the laser pumping emission from the LEDs onto laser rod 42. Rod 42 is appropriately doped with a desired transition element for which the emission spectra of the utilized LEDs provokes a laser emission in the rod. As with the first embodiment described above, a partially reflective, partially transmitting, mirror 44 is employed and is used in conjunction with a reflecting surface 42' of rod 42 to create a laser cavity and allow a laser output 46.

Though the transition elements chromium and titanium have been described above by way of example, the invention is not considered restricted to these. All transition elements are considered suitable for application in this invention. Similarly, though in some instances of the examples given above a single LED is shown or a plurality of LEDs are shown, one can envision that in appropriate applications a reverse usage may be fitting so that a plurality of LEDs is substituted for the single LED and vice-versa. Where a plurality of LEDs are used, one may turn to semiconductor technology to enable these LEDs to be produced lithographically on a single semiconductor substrate, thus producing a monolithic array. Fiber optics, utilizing single fibers and/or fiber bundles, may be employed with these configurations.

Obviously, many modifications and variations of the invention are possible in light of the above description. It is therefore to be understood that within the scope of the claims the invention may be practiced otherwise than as has been specifically described.

What is claimed is:

1. A method comprising the steps of:

providing a solid-state laser rod that includes a transition element; and providing a visible light-emitting-diode so that light emitted by said diode generates a laser emission in said rod.

2. The method of claim 1 wherein fiber optics is used to transport said light.

3. The method of claim 1 wherein said light is continuous wave.

4. The method of claim 1 wherein said light is pulsed.

5. The method of claim 4 wherein said solid-state laser rod has a pump power threshold that is exceeded by said pulsed light.

6. The method of claim 4 wherein said pulsed light has a pulse width of less that 100 nanoseconds.

7. The method of claim 1 wherein said solid-state laser rod includes Cr and wherein said light is substantially red light.

8. The method of claim 7 wherein said laser rod is a Cr:LiSAF laser rod.

9. The method of claim 7 wherein fiber optics is used to transport said light.

10. The method of claim 7 wherein said light is continuous wave.

11. The method of claim 7 wherein said light is pulsed.

12. The method of claim 11 wherein said solid-state laser rod has a pump power threshold that is exceeded by said pulsed light.

13. The method of claim 11 wherein said pulsed light has a pulse width of less that 100 nanoseconds.

14. The method of claim 1 wherein said solid-state laser rod includes Ti and wherein said light is substantially green light.

15. The method of claim 14 wherein said laser rod is a $Ti:Al_2O_3$.

16. The method of claim 14 wherein fiber optics is used to transport said light.

17. The method of claim 14 wherein said light is continuous wave.

18. The method of claim 14 wherein said light is pulsed.

19. The method of claim 18 wherein said solid-state laser rod has a pump power threshold that is exceeded by said pulsed light.

20. The method of claim 18 wherein said pulsed light has a pulse width of less that 100 nanoseconds.

21. The method of claim 1 wherein said solid-state laser rod includes Ti and wherein said light is substantially blue light.

22. The method of claim 21 wherein said laser rod is a $Ti:Al_2O_3$.

23. The method of claim 21 wherein fiber optics is used to transport said light.

24. The method of claim 21 wherein said light is continuous wave.

25. The method of claim 21 wherein said light is pulsed.

26. The method of claim 25 wherein said solid-state laser rod has a pump power threshold that is exceeded by said pulsed light.

27. The method of claim 25 wherein said pulsed light has a pulse width of less that 100 nanoseconds.

* * * * *